Nov. 4, 1952 — H. E. SHOBE — 2,616,514
GAS SEPARATION APPARATUS WITH LIQUID LEVEL CONTROLLER
Filed Sept. 20, 1948
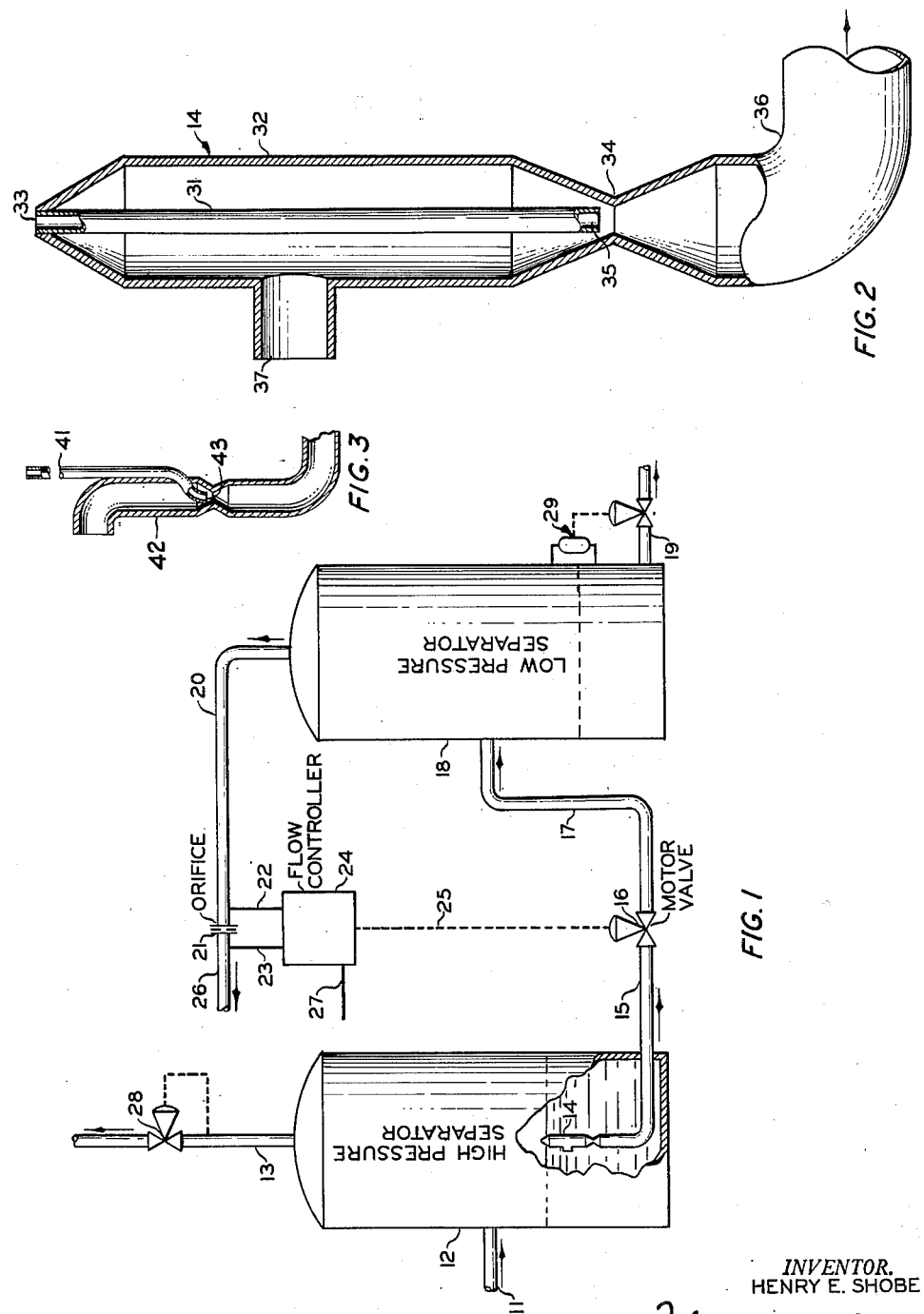
INVENTOR.
HENRY E. SHOBE
BY Hudson & Young
ATTORNEYS Patented Nov. 4, 1952

2,616,514

UNITED STATES PATENT OFFICE 2,616,514

GAS SEPARATION APPARATUS WITH LIQUID LEVEL CONTROLLER

Henry E. Shobe, Bartlesville, Okla., assignor to Phillips Petroleum Company, a corporation of Delaware Application September 20, 1948, Serial No. 50,133

8 Claims. (Cl. 183—2.7)

1

This invention relates to liquid level controllers. In one of its more specific aspects it relates to liquid level controllers for use in gas-liquid separator tanks and has special utility in separator assemblies operating under high pressures.

Conventional liquid level controllers are usually dependent on a float or on the difference in weight of a column of liquid and the gas in contact with it. In the float type of controller, the float may be a hollow object or a solid, but in either case it is sufficiently lighter than an equal volume of liquid to actuate a valve or to actuate a pilot which relays the desired motion to an air or electrically actuated motor valve. The float may be contained in the separator vessel itself or in a special case having lines connecting the case with the liquid and the gas portions of the separator. The float is usually attached to a lever arm which in turn is fastened to a shaft which transmits motion of the float to points outside the separator vessel or the float case. In either case, a packing gland is necessary to prevent leakage of gas or liquid around the shaft.

The second class of controllers uses the weight of a column of liquid to operate some type of pilot or switch which in turn relays the desired motion to a motor valve.

An object of my invention is to provide a liquid level controller for use in liquid gas separators. Another object of my invention is to provide a liquid level controller for use in liquid gas separators operating under high pressures. Another object of my invention is to provide a liquid level controller having no packing glands. Another object of my invention is to provide a liquid level controller for use in high pressure liquid-gas separation having a minimum of moving parts exposed to the high pressures. Still another object of my invention is to provide a liquid level controller apparatus which is simple and inexpensive to construct and which may be repaired or replaced with a minimum of expense. Still other objects and advantages of my invention will be obvious to those skilled in the art upon reading the following disclosure taken in conjunction with the attached drawing, the disclosure and drawing forming a part of this specification.

In the drawing, Figure 1 represents diagrammatically one form of apparatus in which the process of my invention may be carried out. Figure 2 represents diagrammatically the construction of one form of stand pipe used in conjunction with the apparatus of Figure 1. Figure 3 represents another embodiment of standpipe apparatus.

2

Referring now to Figure 1, a separator tank 12 is equipped with three pipe connections, one at a midpoint for passage of gas and liquid feed stock into the tank 12, a connection at the top of the tank is a gas outlet pipe 13, while the connection 15 in the lower portion of the tank is for withdrawal of separated liquid. Pipe 15 is connected with a motor valve 16, which in turn is connected with a pipe 17. Pipe 17 leads to a second separator vessel 18. This latter vessel contains an overhead outlet line 20 and a lower liquid outlet line 19. A conventional liquid level controller 29 is shown for controlling flow of liquid through the line 19. The overhead pipe 20 contains an orifice 21 and material flowing through this pipe and orifice passes on through a pipe 26. A flow controller apparatus 24 has a pipe connection 22 to pipe 20 upstream of the orifice 21 and a pipe 23 connecting with pipe 26 downstream of the orifice. In case the flow controller apparatus 24 operates pneumatically then air or other gas may come from a source, not shown, through a line 27, while if this controller operates electrically, line 27 may represent wires connected to a source of electricity, also not shown. A pipe or wires 25 connects the flow controller 24 with the motor of the motor valve 16.

Figure 2 represents diagrammatically a stand pipe apparatus for use in the lower or liquid containing portion of a high pressure separator vessel. See reference numeral 14, Figure 1. This stand pipe 14 may be composed of an elongated tube 31 of small diameter having both ends open. Surrounding this small diameter tube is a tube 32 having a considerably larger diameter. The upper ends of tubes 32 and 31 are joined together in any manner desired so as to produce a gas-tight connection. To the other end of the outer tube 32 is connected a venturi or other type of constriction 34 so constructed that the lower end 35 of the inner tube 31 terminates at approximately the neck of the venturi. In the sidewall of the larger diameter tube 32 is an opening 37. This opening may be merely an open space in the cylindrical wall of the tube or it may be a short horizontally disposed tube as shown in the drawing. The lower end of the venturi 34 may be connected with a pipe 36 for the passage of materials through the sidewall of the separator 12 and through pipe 15. However, if desired, the tube 36 may be a straight tube for passage through the bottom of the separator 12. However, it may be preferable to construct this tube as illustrated in Figure 2 so that this tube may pass through the sidewall of the tank.

In the operation of this liquid level controller, gas and liquid to be separated may be introduced through the feed line 11 into the separator tank 12 at about a midpoint. In this separator the gas rises and passes out through the overhead gas line 13 and the liquid drops to the lower part and when the level of the liquid reaches opening 37 (Figure 2) it enters the stand pipe 14 and flows through line 15, the motor valve 16 and through line 17 into a second separator vessel 18. This separator vessel 18 operates at a lower pressure than the separator vessel 12. In the separator 18 liquid drops to the bottom and passes through the liquid outlet line 19 as controlled by the liquid level controller apparatus 29. Gas flashed and separated from the liquid as the pressure is reduced in valve 16 rises to the top of the separator 18 and passes through the line 20, orifice 21 and line 26 to such disposal as desired. If a back pressure regulator is not used in line 20, the low pressure separator 18 may then operate at substantially atmospheric pressure or at such back pressure as may be exerted in line 26 from some extraneous source. If it is desired to operate the separator 18 at some pressure a back pressure regulator may then be installed in the line 20.

The flow controller apparatus 24 is conventional apparatus widely used in the art and may be selected from among the products of many instrument manufacturers. The use of air or other gas for the operation of controllers and motor valves is very common and I will illustrate this controller assembly as operating on air pressure.

The flow controller 24 may be set to be actuated at a certain predetermined pressure differential of gas passing through the orifice 21. For normal operation this predetermined pressure differential must be somewhat higher than that corresponding to the rate at which gas is flashed from the liquid as the liquid enters the low pressure separator 18. In operation, the flow controller 24 causes the motor valve 16 to be open when the gas flow through the orifice 21 is less than that corresponding to the setting of controller 24. The flow of gas through the orifice affects the controller by differences in pressure through the connecting tubes 22 and 23 positioned respectively upstream and downstream of the orifice. As the motor valve 16 opens liquid flow from the high pressure separator 12 to the low pressure separator 18 increases and gas flow through the orifice 21 increases correspondingly. This increase affects the flow controller through the tubes 22 and 23 and, when the increase is undesirably high, the controller operates to close or to partly close the motor valve 16. As the level of the liquid in the separator 12 is lowered to the top 33 of the stand pipe 14, gas goes through the tube 31, through the venturi into a line 36 and through line 15, valve 16, and pipe 17 into the low pressure separator. The increased volume of gas in separator 18 then passes through the gas outlet line 20 and through the orifice 21 and the increased pressure differential across this orifice causes the flow controller to operate and to partly close the motor valve 16. In this manner, the greater the volume of gas passing from the high pressure separator to the low pressure separator, the greater will be the tendency of the flow controller to close the motor valve and in this manner the loss of high pressure gas will be reduced to a minimum. Referring to Figure 2, in normal operation the level of the liquid in the high pressure separator is maintained between the top point 33 of the stand pipe and the top side of the opening 37. Preferably, it remains near the top 33. The bulk of the liquid enters the stand pipe through the inlet 37 and a lesser amount of liquid enters through the opening 33 when the liquid level is higher than the point 33. As the liquid level falls below point 33, gas is drawn through the inner tube 31 in an amount governed by the liquid level and the rate of liquid flow through the Venturi construction 34. The maximum and minimum fluctuations in liquid level may be controlled by constructing the stand pipe as regards the position of the opening 37 relative to the top 33 of the stand pipe.

In starting the operation of this apparatus in systems in which the liquid rate may vary widely or where the amount of gas dissolved in the liquid is not known accurately, the gas flow through the orifice 21 may be sufficiently high to allow a substantial amount of gas to escape from the separator 12 through the stand pipe 14 into the low pressure separator 18. This high gas flow will allow for widely varying liquid rates without danger of liquid completely filling the separator 12. As flow rates become more steady the setting of the controller 24 may be lowered until it is only slightly higher than the amount of gas flashed in the low pressure separator, thus giving a normal operational control. The stand pipe 14 is designed by provision of tube 31 so that as the liquid level is decreasing a small amount of gas will enter the stand pipe before the liquid level is down to the main stand pipe opening 37. The amount of gas entering the stand pipe may be controlled according to the diameter of the inner tube 31. However, sufficient gas should flow through the inner tube 31 when added to the gas flashed in the low pressure separator that the total gas stream will be sufficiently large to operate the flow controller apparatus. A more steady flow of liquid may ordinarily be obtained from the high pressure separator to the low pressure separator when some gas enters the liquid stream through the inner tube 31 and in this manner hammering or knocking effects or rapidly closing off or opening up of valve 16 to liquid flow are avoided.

On laboratory or bench scale equipment for high pressure processes, regular types of liquid level controllers are difficult and expensive to obtain. For example, in flow controllers for such small scale use, the floats are so small that they have too little lifting power to actuate valves or even pilots. Such control apparatus as the herein disclosed stand pipe may be made for small scale equipment by merely constructing a small stand pipe having an inner tube of small or even very small diameter and the side opening 37 may be of size sufficient for passage of the volume of liquid being processed.

This level control apparatus as herein disclosed has special utility in high pressure separation steps, for example, in hydrogenation work in which liquid and gas may need be separated under such high pressures as 5,000 pounds per square inch or even higher pressures. The materials of construction need not be special materials, but should be selected from the point of view of resistance to corrosion of materials of the process. The high pressure separator tank, of course, and the motor valve 16 should be of such design and construction as to function properly under the desired pressure. The motor valve 16 and the back pressure regulator 28 are the only moving pieces of equipment exposed to high pressures. Another advantage of my invention is that in case repair or cleaning need be done to the automatic control apparatus such work may be done without depressuring the high pressure separator tank since all such equipment is outside of this tank.

It will be obvious to those skilled in the art that the stand pipe apparatus may be designed to meet varying conditions since the height of the stand pipe, the diameter of the inner tube 31, the size and positioning of the side inlet 37 may be varied as desired.

The actual structure described hereinabove is given merely as an example since other modifications of the apparatus, in principle, may be used. For example, the two tubes 31 and 32 need not be concentrically disposed, the inner tube 31 may be off center, as tubes 41 and 42 of Figure 3, with tube 41 having a terminal opening 43 as shown. And further, the tube 31 need not necessarily be disposed within tube 32, as illustrated, but it may be positioned outside the latter tube, as tube 41 of Figure 3. However, the lower end of the smaller tube must then pass through the sidewall of the outer tube so that a venturi structure may be realized. The upper end of the large tube may then be closed and the tube must carry a side opening as shown. In still another form, the large diameter tube may be shorter than the small diameter tube and its upper end terminating with a pipe L so that the actual opening in the large diameter pipe will be disposed approximately in a vertical plane.

Having disclosed my invention, I claim:

1. An apparatus for use in the removal of gas and liquid from a vessel comprising an elongated vertically disposed tube of small diameter and open at both ends, a second tube of greater diameter than the first tube and disposed concentric with and surrounding said first tube, the upper end of said first tube and the adjacent end of said second tube joined in a gas-tight manner, the inner tube is of such length that it terminates within the throat of a venturi connected with the lower end of said second tube, and an opening in the sidewall of the second tube.

2. An apparatus for use in the removal of gas and liquid from a vessel comprising an elongated and vertically disposed tube of small diameter and open at both ends, a second tube of greater diameter than the first tube surrounding said first tube, the upper end of said first tube and the adjacent end of said second tube joined in a gas-tight manner, the inner tube is of such length that it terminates within the throat of a venturi connected with the lower end of said outer tube, and an opening in the sidewall of the outer tube.

3. An apparatus for use in the removal of gas and liquid from a vessel comprising a first elongated and generally vertically disposed tube open at both ends, a second tube rigidly attached to said first tube, one end of said second tube is joined with one end of a venturi in such a manner that one end of said first tube terminates in the throat of the venturi, the other end of said second tube terminating as an opening at a point intermediate said venturi and the other end of said first tube, one axis of said terminal opening being horizontal.

4. In an apparatus for the separation of a gas from a liquid the combination comprising a first separator tank having an inlet pipe for introduction of fluid to be separated, an outlet pipe in the top of the tank for outlet of gas, an outlet pipe at the bottom for outlet of liquid and gas, a motor valve disposed in said liquid and gas outlet pipe, a second separator tank having an inlet pipe connected with said outlet pipe of said first separator tank for introduction of liquid and gas, an outlet pipe in the top of said second separator for outlet of gas and an outlet pipe at the bottom thereof for outlet of liquid, an elongated and vertically disposed standpipe apparatus in the first separator tank comprising, in combination, a first elongated and vertically disposed tube, a second elongated tube of greater diameter than said first tube disposed concentric with and surrounding said first tube, the top end of said first tube joined with the adjacent end of said second tube to form a gas-tight joint, the other end of said second tube joined with one end of a venturi in such a manner that the adjacent end of said first tube terminates in the throat of the venturi, an opening in the wall of the second tube at a midpoint between said joined end and said venturi, the other end of the venturi joined with the inner end of said outlet pipe at the bottom of said first tank, said standpipe apparatus disposed in the lower and liquid-containing portion of said first tank at such a distance from the bottom of said first tank that said opening in the wall of said second tube is positioned at a predetermined distance from the bottom of the tank at which it is desired to maintain the lower level of the liquid, and means responsive to the flow of gas in the top outlet pipe of said second separator tank for operating said motor valve for removing liquid and gas from said first separator tank for maintenance of the liquid level at said predetermined distance from the bottom of said first tank.

5. In an apparatus for the separation of a gas from a liquid the combination comprising a first separator tank having an inlet pipe for introduction of fluid to be separated, an outlet pipe in the top of the tank for outlet of gas, an outlet pipe at the bottom for outlet of liquid and gas, a motor valve disposed in said liquid and gas outlet pipe, a second separator tank having an inlet pipe connected with said outlet pipe of said first separator tank for introduction of liquid and gas, an outlet pipe in the top of said second separator for outlet of gas and an outlet pipe at the bottom thereof for outlet of liquid, an elongated and vertically disposed standpipe apparatus in the first separator tank comprising, in combination, a first elongated and vertically disposed tube, a second elongated tube surrounding said first tube, the top end of said first tube joined with the adjacent end of said second tube to form a gas-tight joint, the other end of said second tube joined with one end of a venturi in such a manner that the adjacent end of said first tube terminates in the throat of the venturi, an opening in the wall of the outer tube, the other end of the venturi joined with the inner end of said outlet pipe at the bottom of said first tank, said standpipe apparatus disposed in the lower and liquid-containing portion of said first tank at such a distance from the bottom of said first tank that the upper open end of said first tube is positioned at a predetermined distance from the bottom of the tank at which it is desired to maintain the upper level of the liquid, and means responsive to the flow of gas in the top outlet pipe of said second separator tank for operating said motor valve for removing liquid and gas from said first separator tank for maintenance of the liquid level at said predetermined distance from the bottom of said first tank.

6. In an apparatus for the separation of a gas from a liquid, the combination comprising a first separator tank having an inlet pipe for introduction of fluid to be separated, a gas outlet line disposed in the top of the tank, a liquid and gas outlet line disposed in the bottom thereof, a liquid and gas withdrawal standpipe apparatus in the liquid containing portion of said first separating tank, said standpipe apparatus comprising, in combination, a first elongated and generally vertically disposed tube open at both ends, a second tube attached to said first tube, one end of said second tube being joined with one end of a venturi in such a manner that the lower end of said first tube terminates in the throat of the venturi, the other end of said second tube terminating as an opening at a point intermediate said venturi and the other end of said first tube and said standpipe apparatus being so disposed with respect to the bottom of said first separator tank that said opening in the second tube defines the position of the lower level of the liquid, a second separator tank having a gas outlet line in its top, a liquid outlet line in its bottom and a side fluid inlet line, said liquid and gas outlet line from said first separator tank having a motor valve therein and communicating with said fluid inlet line of said second separator, an orifice in the gas outlet line of said second separator tank and means responsive to the flow of gas through said orifice to actuate said motor valve.

7. In an apparatus for the separation of a gas from a liquid, the combination comprising a first separator tank having an inlet pipe for introduction of fluid to be separated, a gas outlet line disposed in the top of the tank, a liquid and gas outlet line disposed in the bottom thereof, a liquid and gas withdrawal standpipe apparatus in the liquid containing portion of said first separating tank, said standpipe apparatus comprising, in combination, a first elongated tube generally vertically disposed and open at both ends, a generally vertically disposed second tube joined at its lower end to one end of a venturi, said first tube being joined with said second tube in such a manner that the lower end of said first tube terminates in the throat of said venturi, an opening in the second tube disposed above the venturi but below the upper end of said first tube, the other end of said venturi, communicating with the liquid and gas outlet line in the bottom of said first tank and said standpipe apparatus being so disposed with respect to the bottom of said first separator tank that said opening in the second tube defines the position of the minimum level and the top end of said first tube defines the position of the maximum level of the liquid in the tank, a second separator tank having a gas outlet line in its top, a liquid outlet line in its bottom and a side fluid inlet line, said liquid and gas outlet line from said first separator tank having a motor valve therein and communicating with said fluid inlet line of said second separator, an orifice in the gas outlet line of said second separator tank and means responsive to the flow of gas through said orifice to actuate said motor valve.

8. An apparatus for the removal of gas and liquid from a vessel comprising, in combination, a first elongated tube generally vertically disposed and open at both ends, a generally vertically disposed second tube joined at its lower end to one end of a venturi, said first tube being joined with said second tube in such a manner that the lower end of said first tube terminates in the throat of the venturi, and an opening in the second tube disposed at a point between said venturi and the upper end of said first tube.

HENRY E. SHOBE.

REFERENCES CITED

The following references are of record in the file of this patent:

UNITED STATES PATENTS

| Number | Name | Date |
|---|---|---|
| 1,841,505 | Sweetland | Jan. 19, 1932 |
| 2,225,949 | Bennett | Dec. 24, 1940 |
| 2,230,619 | Katz | Feb. 4, 1941 |
| 2,414,371 | Fragen et al. | Jan. 14, 1947 |

FOREIGN PATENTS

| Number | Country | Date |
|---|---|---|
| 546,130 | Great Britain | June 29, 1943 |